J. J. MURPHY.
STEREOSCOPE.
APPLICATION FILED APR. 12, 1915.

1,194,057.

Patented Aug. 8, 1916.
5 SHEETS—SHEET 2.

INVENTOR:
John J. Murphy,
By Albert H. Baker
Atty.

J. J. MURPHY.
STEREOSCOPE.
APPLICATION FILED APR. 12, 1915.

1,194,057.

Patented Aug. 8, 1916.
5 SHEETS—SHEET 3.

INVENTOR.
John J. Murphy,
By Albert H. Oaks, atty.

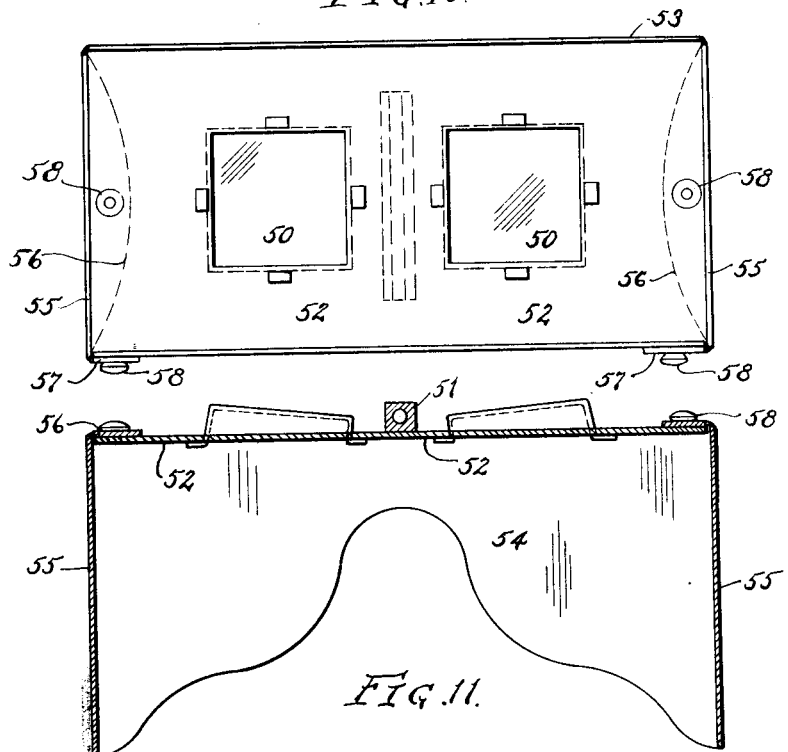
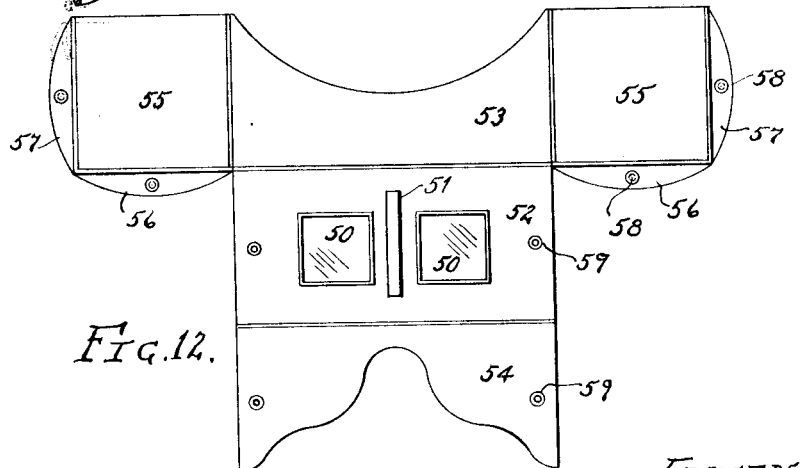

J. J. MURPHY.
STEREOSCOPE.
APPLICATION FILED APR. 12, 1915.
1,194,057.
Patented Aug. 8, 1916.
5 SHEETS—SHEET 5.
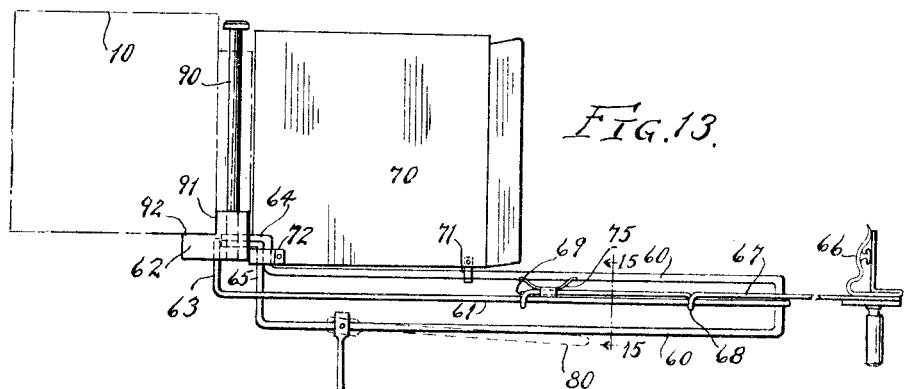
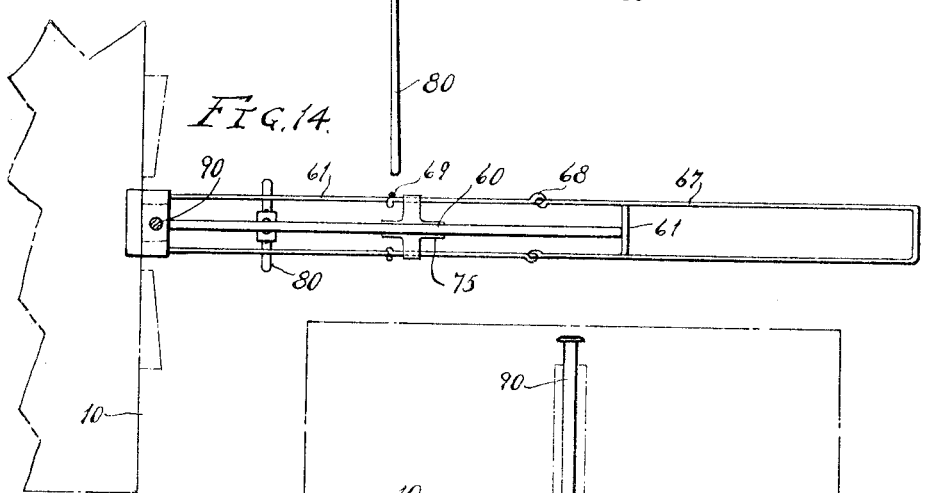
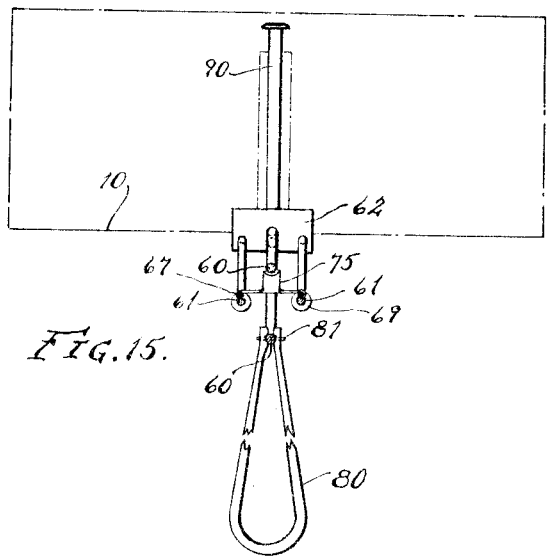
INVENTOR:
John J. Murphy,
By Albert H. Baker
Atty.

UNITED STATES PATENT OFFICE.

JOHN J. MURPHY, OF TOLEDO, OHIO, ASSIGNOR TO THE CORTE-SCOPE COMPANY, OF CLEVELAND, OHIO, A CORPORATION OF OHIO.

STEREOSCOPE.

1,194,057.                  Specification of Letters Patent.     Patented Aug. 8, 1916.

Application filed April 12, 1915. Serial No. 20,620.

*To all whom it may concern:*

Be it known that I, JOHN J. MURPHY, a citizen of the United States, residing at Toledo, in the county of Lucas and State of Ohio, have invented a certain new and useful Improvement in Stereoscopes, of which the following is a full, clear, and exact description, reference being had to the accompanying drawings.

The object of this invention is to provide a simple, cheap and effective folding stereoscope. My stereoscope, when folded, lies substantially flat in a very small space and is very readily extended into operative position, providing a complete stereoscope, consisting of a hood with lenses, an extensible shaft with a view holder, a septum, and a handle.

The invention is hereinafter more fully described and the essential characteristics are summarized in the claims.

Figure 1:
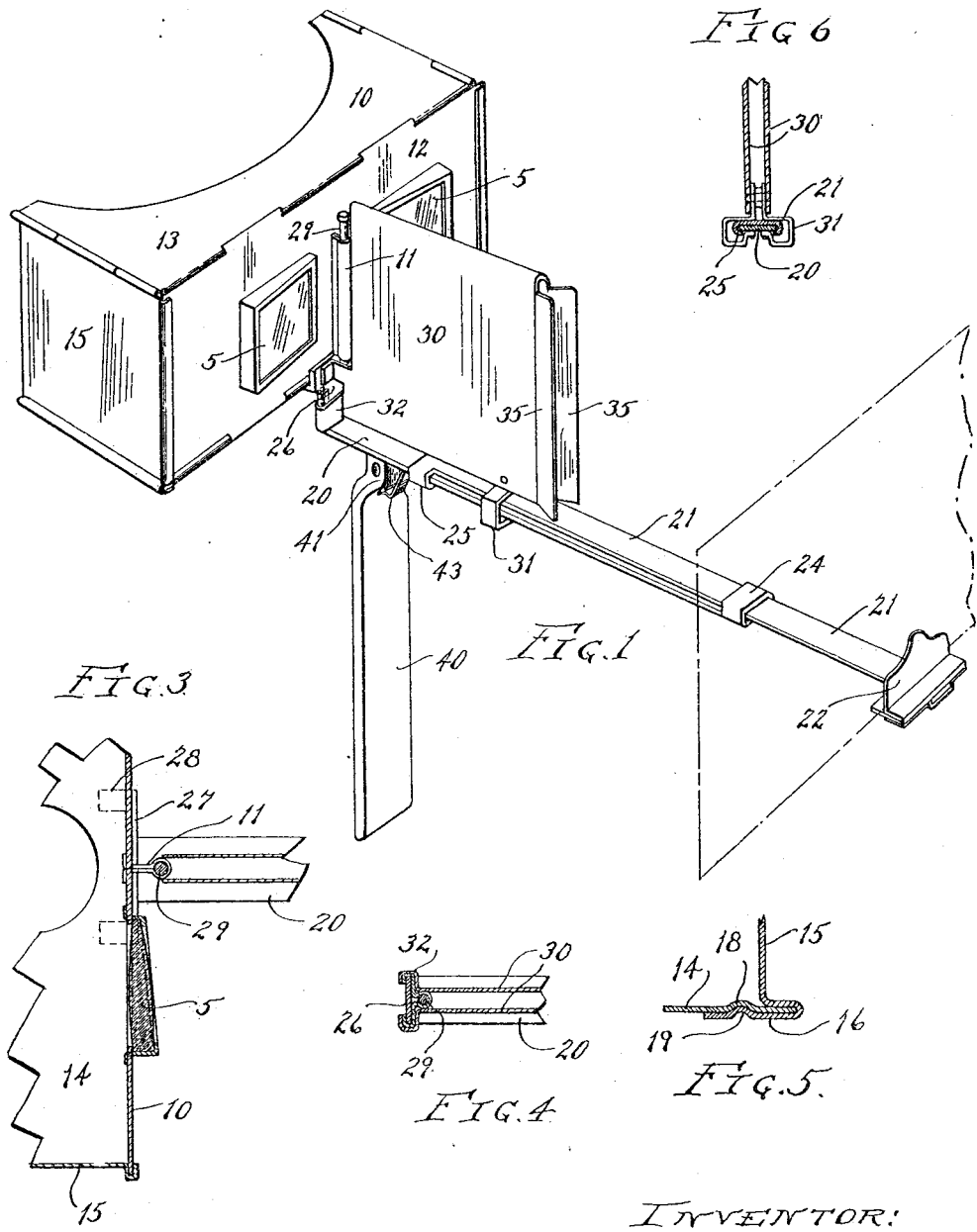
Figure 2:
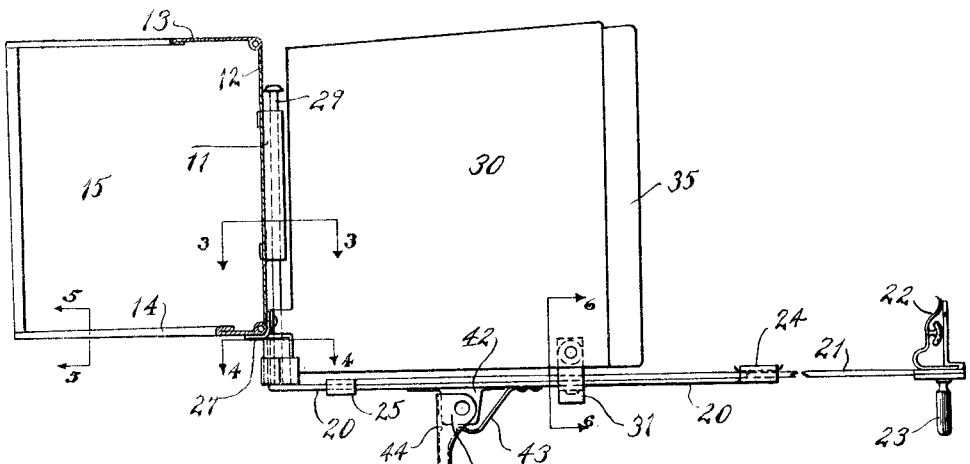
Figure 7:
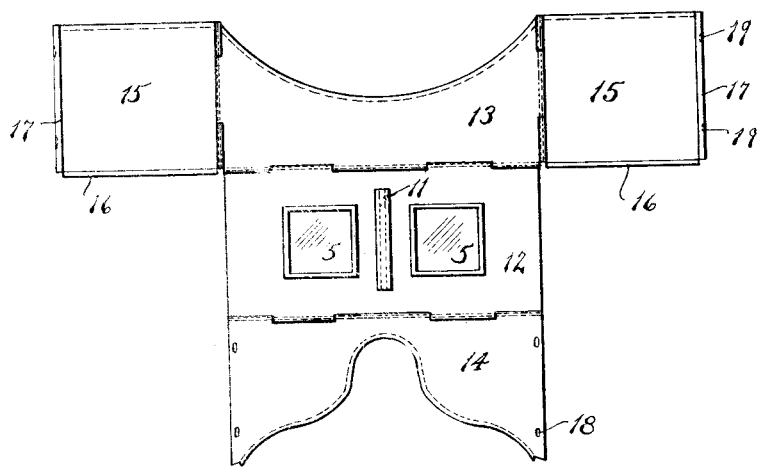
Figure 8:
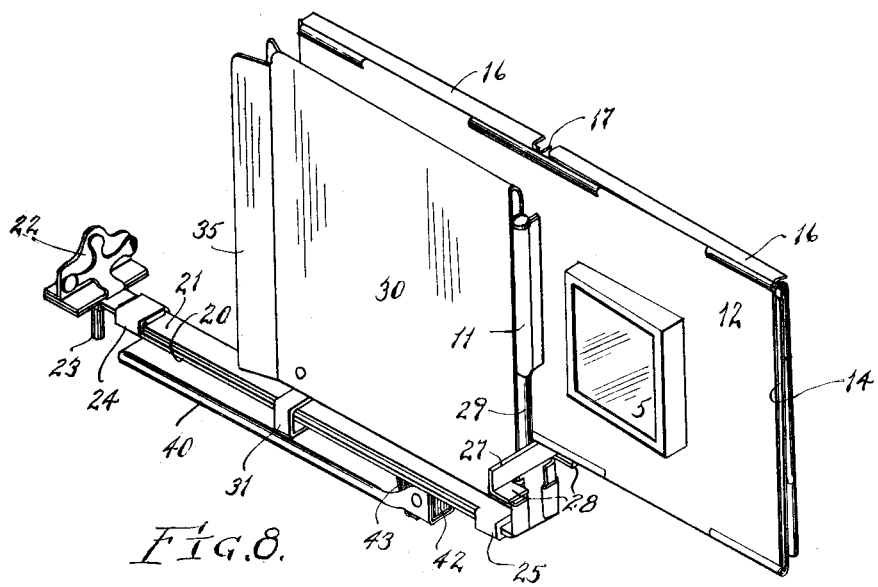
Figure 9:
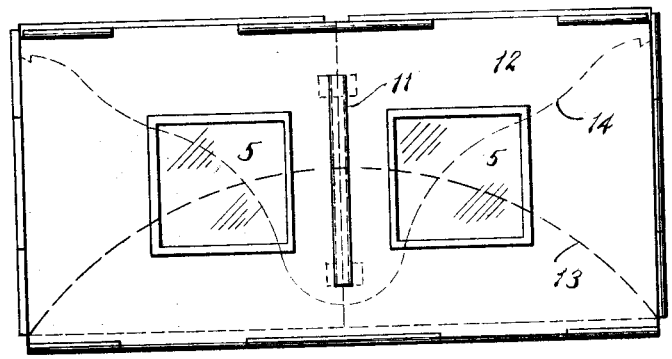

In the drawings, Figure 1 is a perspective view of an approved form of my stereoscope; Fig. 2 is a side elevation thereof; Figs. 3 to 6 inclusive are details, being cross sections on the correspondingly numbered lines on Fig. 2; Fig. 7 is a view of the hood with its various parts extended into one plane, showing how these parts may be connected with each other; Fig. 8 is a perspective view of the stereoscope folded; Fig. 9 is a front elevation of the hood when folded; Figs. 10 to 12 inclusive illustrate a modified form of the hood, Fig. 10 being a front elevation, Fig. 11 a horizontal section, and Fig. 12 a view of the hood extended into one plane; Figs. 13 to 15 inclusive illustrate a modified form of shaft and handle with the hood indicated in broken lines, Fig. 13 being a side elevation, Fig. 14 a plan, and Fig. 15 a section on the line 15—15 of Fig. 13.

Referring first to Figs. 1 to 9 inclusive, 10 indicates the hood having the lenses 5. 20 and 21 indicate a two-part extensible shaft, the latter of which carries any suitable view holder, as indicated at 22. 30 indicates the septum secured to the bar 20 and also having the hood connected with the rear end. 40 indicates the handle pivoted, as hereinafter described, to the bar 20 of the shaft. These parts will now be more fully described.

The hood 10 is shown as consisting of five plates adapted to form five sides of a rectangular box-like structure or be folded flat. I accomplish this as follows: One member of the hood consists of a lens plate 12 having a pair of visual openings and suitably carrying the two lenses 5. To the upper edge of this plate is hinged the top or vizor plate 13 and to the lower edge is hinged the bottom or nose plate 14. At the opposite ends of the vizor plate are hinged two end flaps 15, 15. The bottom edge 16 and far edge 17 of each flap are bent to provide an outwardly extending portion and a returning flange, thus leaving adjacent to the flange a groove. When the hood is folded this groove is adapted to receive and embrace the edge of either the lens plate or the bottom plate, as the case may be. To hold the flaps together when thus assembled, I provide suitable dents 18 in the bottom plates adjacent to the edge and corresponding projections in the flange 19 adapted to nest therewith and lock the parts in assembled form while enabling them to be easily separated. The dents and projections referred to may be easily made by indenting the material of the structure, forcing out projections from the opposite sides. The hood described may conveniently be made of metal, as, for example, sheet aluminum. Fig. 7 shows such a structure as described with the five plates of the hood extended into one plane. Now, with the top plate and bottom plate swung over parallel with each other and at right angles to the lens plate, and with the end flaps swung downward at right angles to the top and bottom plate and lens plate, the box-like hood shown in Fig. 1 is produced. In folding this hood, it is only temporarily extended into the form shown in Fig. 7, for, when fully folded, the bottom plate 14 lies against the inner face of the lens plate, the top plate 13 lies against the plate 14, and the end flaps are swung back onto the upper face of the vizor plate. The hood is thus folded into a flat form having substantially the lateral extending of the lens plate, and having a thickness substantially that of the sum of the parts themselves. When the parts are made of thin sheet metal, as they readily may be, the folded hood is very compact. The shaft of my stereoscope may comprise the two flat bars 20 and 21, the former of which is provided at its forward end with the flat loop 24, through which slides the bar 21, while the bar 21 is provided at its rear end with ears 25 looping around the bar 20. Any suitable view holder 22, and preferably a finger handle 23, are provided on the forward end of the bar 21. The bar 20 is turned upwardly at its rear end, as at 26, and at the top of this upward extension is formed a lateral T head or cross bar 27 which has rearwardly projecting lips 28. Secured to the upward extension 26 of the shaft is a vertical rod 29. This rod, together with the cross bar 27 and lips 28, carries the hood, as hereinafter described.

Above the shaft and in front of the hood is the septum 30. This is composed of a doubled or U-shaped sheet having open vertical ends and an open bottom. Extending between the two sides of the septum near the bottom and secured to it are a pair of arms 41 which extend outwardly freely around the bar 21 of the shaft and are secured to the under side of the shaft bar 20, as clearly shown in Fig. 6. At its rear end the septum has ears 32 which extend outwardly from the two sides and loop around the edges of the upwardly extending portion 26 of the shaft. The forward ends 35 of the septum are bent or flared outwardly, as shown. The amount of outward extension may be changed by bending these forward projecting portions to accommodate peculiar vision of the user, or difference between his eyes.

The upright bar 29 carried by the shaft lies directly in front of and between the two plates of the septum 30. Surrounding this bar is a tubular clip 11 on the lens plate 12 between the lenses 5. This conveniently hinges the hood to the shaft and septum. In normal position, the hood is held at right angles to the septum by reason of its rear face bearing against the cross bar 27, the hood being supported in this position by the lips 28. To fold the lens plate against the septum, however, it is only necessary to raise the hood sufficiently to cause its lower end to clear the cross bar 27, whereupon it may be swung into position parallel with the septum, as shown in Fig. 8.

40, in Figs. 1 and 2, indicates the handle for my stereoscope. This is shown as a flat hollow metal member having near its upper end ears 41 by which it is pivoted on a downwardly extending lug 42 on the under side of the shaft bar 20. A suitable spring holds the handle 40 extended at right angles, as shown in Fig. 2, against accidental displacement. Such spring is shown at 43 and is adapted to extend through the opening 44 in the handle and has a shoulder bearing against the metal of the handle adjacent to the opening.

The construction described readily folds into the position shown in Fig. 8. The shaft is telescoped upon itself and the handle is folded up along the under side of the shaft, the lens plate is folded against the side of the septum, and the various members of the hood are folded onto the lens plate. In such form the stereoscope occupies very little space and may conveniently be put in one's pocket or a suitable comparatively flat package.

Instead of making the hood of thin metal plates, I may make it of straw-board, fiber, or book-binders' material, providing suitable cloth or leather hinges in place of the metal hinges described, and providing suitable fastening devices, after the manner of glove fasteners, on the lower and far edges of the end flaps. Such construction is shown in Figs. 10 to 12, where there are sheets of fiber covered on both sides with cloth. In these views, 52 indicates the lens plate carrying the lenses 50 and a vertical tubular block 51. 53 is the vizor plate, 54 the bottom plate, and 55 the end plates. The lower edges and the far edges of these end plates are provided with flaps 56 and 57 respectively, and these flaps have suitable glove fasteners 58 which are adapted to coact with corresponding studs 59 on the lens plate and bottom plate respectively.

The head just described may be made of very cheap material. It folds in the same manner as the hood previously described and operates in the same way when extended.

Figs. 13 to 15 inclusive illustrate a modified form of shaft and handle designed for cheapness of construction. In this case, the shaft comprises a wire 60 bent into a rectangular course and lying in a vertical plane, and a wire 61 bent into two parallel reaches and lying in a horizontal plane. The two ends of the wire 60 are brought together at the rear of the loop thus formed and project into the forward side of the block 62. The wires 61 are turned upwardly at their rear ends, as shown at 63, and project into the bottom of this block. The wire 61 at its doubled portion, crosses the forward end of the wire 60 and is soldered or otherwise secured to it. The septum 70 is provided with a clip 71 embracing the upper reach of the wire 60 and with a clip 72 embracing the upward portions 64 and 65 of this wire.

With the construction last described, the telescoping member of the shaft consists of a bent two-armed wire 67 which has loops or eyes 68 and 69 surrounding the horizontal wire 61. At the doubled portion of the extension wire it is provided with a view holder 66, and near its rear ends carries a restraining spring 75 bearing against the upper wire 60.

The handle, in the construction just described, is shown as a single U-shaped piece of metal 80 which extends onto opposite sides of the lower reach of the wire 60 and is pivoted to it by a pin 81. The handle is of spring metal and has notches embracing the wire with sufficient force to normally hold the handle extended at right angles to the wire, as shown in Fig. 13. A suitable force, however, readily folds the handle into the position shown in dotted lines in this figure.

In the construction last described, the block 62 carries the upwardly extending pin 90 on which the hood is journaled. The rear vertical face 91 of the block forms a guide engaging the front of the hood and preventing its swinging on the pin, and the upper face 92 of the rearward extension of the block forms a support for the hood in this position. The simple raising of the hood, however, allows it to be swung against the side of the septum 70.

It will be seen that the form of shaft last described, as well as the form shown in Figs. 1 and 2, may be used in connection with either form of hood described. That is to say, each shaft provides the upwardly extending hinged pin for the hood, as well as the telescoping feature for finding the focus, and the adjustable handle, and each form of hood has the central, vertical, tubular member adapted to embrace the upstanding pin, and is composed of the five plates foldable upon each other and thus adapted to lie snugly against the side of the septum when the structure is collapsed.

Having thus described my invention, what I claim is:

1. In a folding stereoscope, the combination with a shaft, of a hood permanently hinged on a vertical axis connected with the shaft.

2. The combination of a shaft, a septum carried thereby, and a hood hinged on a vertical axis at the rear end of the septum and adapted to be swung into substantial parallelism with the septum.

3. The combination of a shaft, a septum carried thereby, and a collapsible hood hinged on a vertical pivot at the rear end of the septum.

4. In a stereoscope, the combination of an extensible shaft, a septum rising from the upper side of one member of the shaft, a handle pivoted to the under side of such member of the shaft, and a hood hinged adjacent to the rear end of the septum.

5. In a folding stereoscope, the combination of a shaft, an upwardly extending portion carried thereby adjacent to the rear end of the shaft, and a collapsible hood connected with the shaft by having its lens plate hinged on said upwardly extending portion.

6. In a stereoscope, the combination of a shaft having an upwardly extending bar, a hood hinged on said bar and adapted to swing into substantial parallelism with said shaft, said shaft having a supporting portion adapted to engage the under side of the hood and having a portion adapted to engage the front of the hood to prevent the same rocking on the pivot pin.

7. In a stereoscope, the combination of a shaft, a collapsible hood having its lens plate centrally hinged on a vertical axis to the shaft and having a top-plate hinged to the upper edge of the lens plate.

8. In a stereoscope, the combination of a shaft carrying adjacent to its rear end a vertical pivot pin, a collapsible hood having a lens plate hinged on said pivot pin and having a top plate hinged to the lens plate and having end flaps hinged to one of the plates mentioned and adapted to engage the other.

9. A collapsible hood for stereoscopes comprising a lens carrier having a pair of spatially arranged lenses, a top plate and a bottom plate hinged to the lens carrier, end flaps hinged to one of the plates mentioned, and means on the lens carrier between the lenses for pivotally mounting the hood.

10. A folding stereoscope hood comprising a lens carrier, top and bottom plates hinged thereto, end flaps hinged to one of said plates and adapted to engage the other, means for locking the end flaps in position to make a box-like hood, and means on the lens carrier for movably securing the hood to the rest of the stereoscope.

11. In a stereoscope, the combination of a shaft, a collapsible hood comprising a lens carrier, top and bottom plates hinged thereto, end flaps adapted to substantially close the space between the top and bottom plates and the lens carrier at the ends, and means for movably carrying the hood on the shaft.

12. The combination of a telescoping shaft, a handle secured to one member of the shaft and adapted to fold in a substantially horizontal position along the under side of the shaft, a septum on the upper side of the shaft, and a collapsible hood hinged on a vertical axis adjacent to the rear end of the septum.

13. The combination of a telescoping shaft, a handle secured to one member of the shaft and adapted to fold in a substantially horizontal position along the under side of the shaft, a septum on the upper side of the shaft, and a collapsible hood having a lens plate centrally hinged on a vertical axis at the rear end of the septum and having a top plate hinged to the upper edge of the lens plate.

14. A collapsible stereoscope hood comprising a lens plate at the front of the hood, a top plate hinged to the upper edge of the lens plate and end flaps hinged to the top plate and adapted to have their forward edges engage the ends of the lens plate.

15. A collapsible hood for stereoscopes adapted to restrict the light between the observer's eyes and the lenses, said hood comprising a lens plate, a top plate and a bottom plate hinged to the lens plate, and end flaps hinged to one of the plates mentioned.

16. A collapsible hood for stereoscopes comprising a lens plate forming the front of the hood, a top plate hinged to the upper edge of the lens plate, and adapted to extend rearwardly therefrom, a bottom plate hinged to the lower edge of the lens plate and adapted to extend rearwardly therefrom, end flaps hinged to the ends of the top plate and adapted to have their forward edges engage the ends of the lens plate and their lower edges engage the ends of the bottom plate.

17. In a folding stereoscope hood, the combination of a lens carrier forming the front face of the hood, top and bottom plates hinged thereto, end flaps hinged to one of said plates and adapted to engage the other, and means for locking the end flaps in a position to make a box-like hood.

18. In a collapsible hood, the combination of a lens carrier forming the front face of the hood, top and bottom plates hinged to the top and bottom edges of the lens carrier and adapted to extend rearwardly, end flaps hinged to the edges of one of said plates, means whereby the forward and bottom edges of said flaps engage the ends of the lens carrier and the ends of the other plate when the hood is in box-like form, and means for locking the end flaps in this position.

19. A collapsible hood for stereoscopes adapted to restrict the light between the observer's eyes and the lenses, said hood comprising five plates hinged together on four axes and adapted to be folded in a box-like form, and lenses carried by one of the plates.

20. A collapsible hood for stereoscopes comprising five plates hinged together on four axes and adapted to be folded in a box-like form, lenses carried by one of the plates, an extensible view carrier, and means for pivotally securing it to the plate which carries the lenses.

21. In a folding stereoscope, the combination of a telescoping shaft, a hinged handle connected therewith, and a collapsible hood hinged on a vertical axis, said hood comprising a lens plate, other plates carried thereby and adapted to be folded upon axes into position parallel with the lens plate.

In testimony whereof, I hereunto affix my signature in the presence of two witnesses.

JOHN J. MURPHY.

Witnesses:
 ALBERT H. BATES,
 JUSTIN W. MACKLIN.

Copies of this patent may be obtained for five cents each, by addressing the "Commissioner of Patents, Washington, D. C."